Patented Nov. 14, 1922.

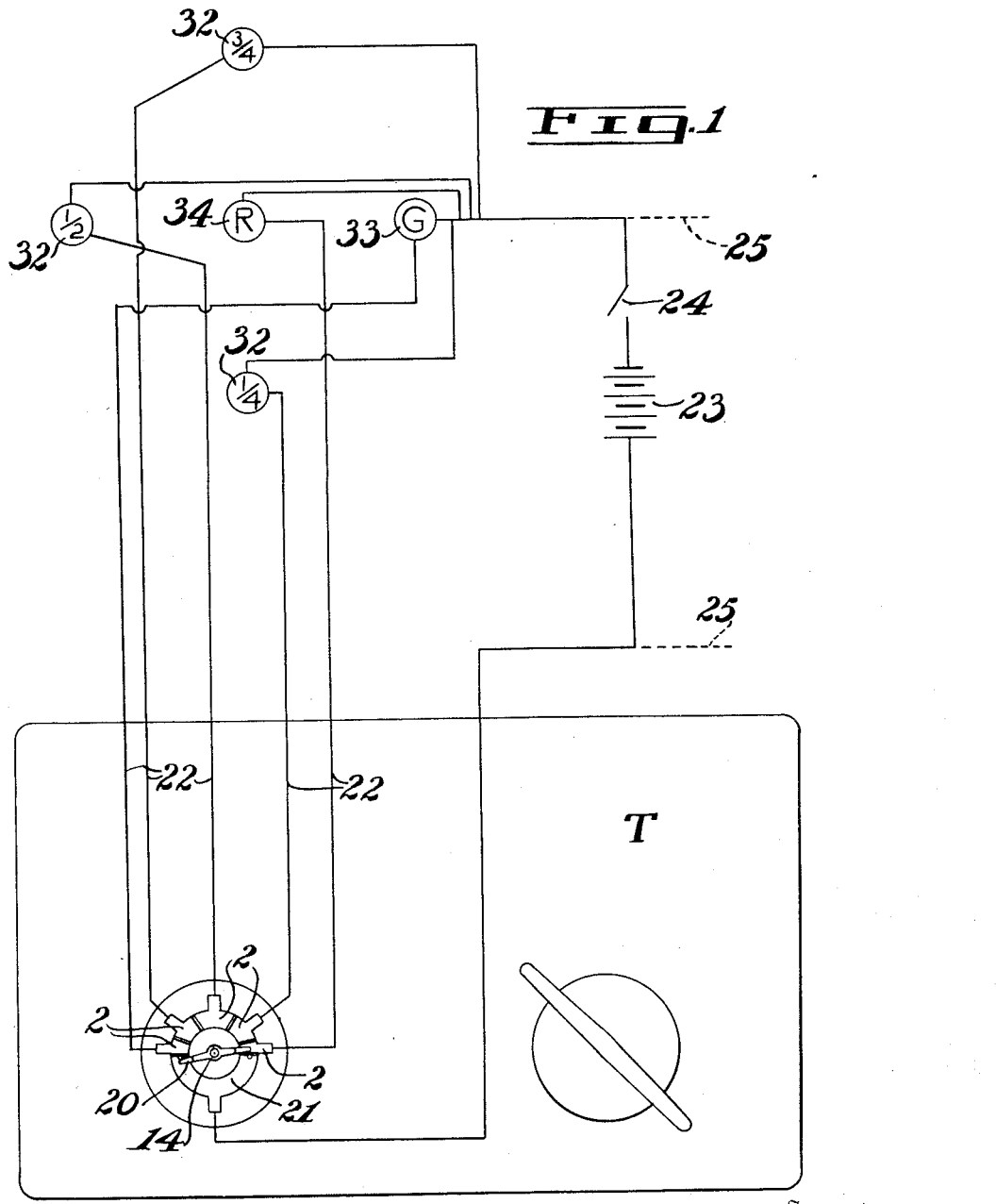

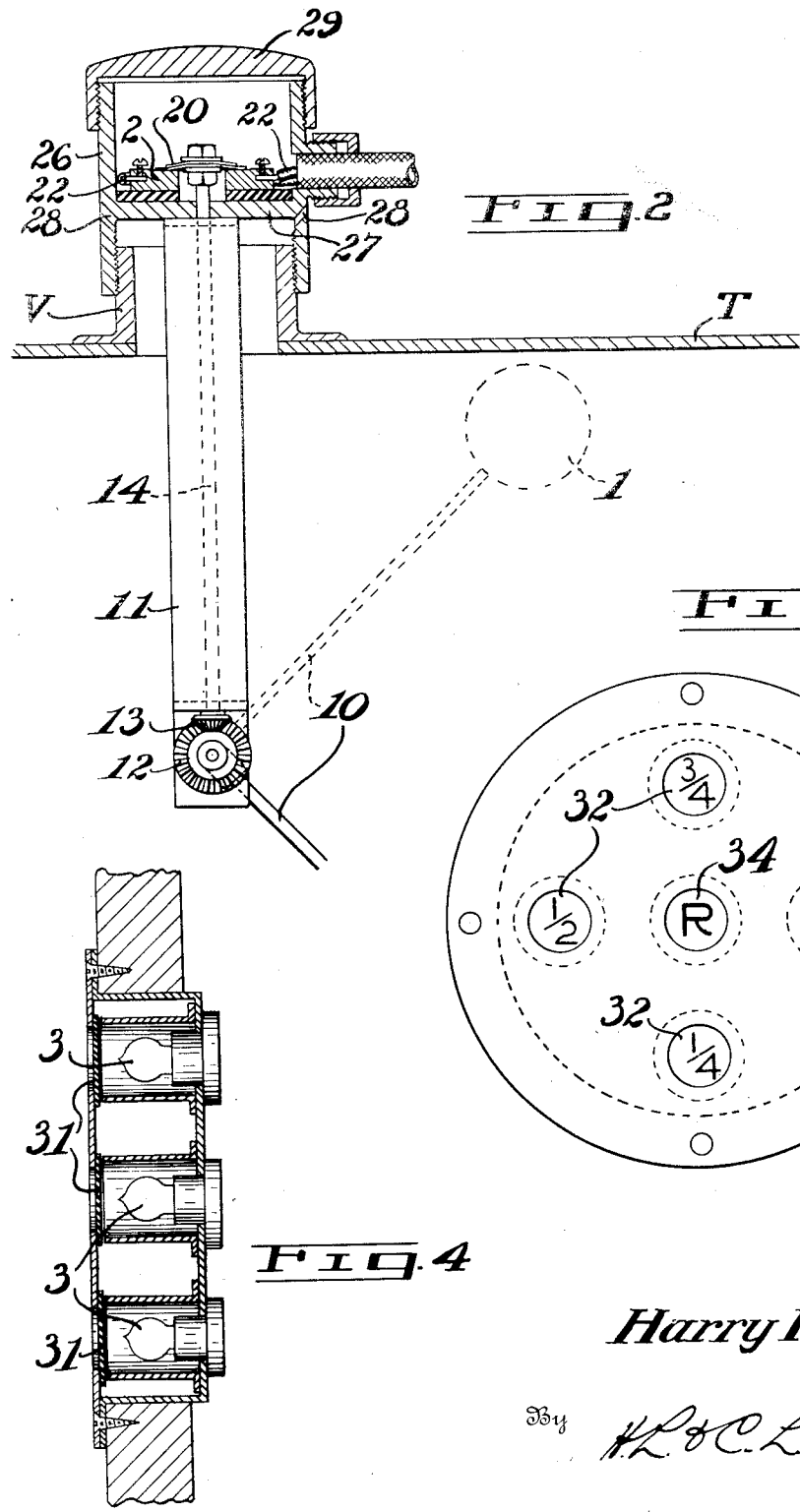

1,435,411

UNITED STATES PATENT OFFICE.

HARRY R. MITCHELL, OF SEATTLE, WASHINGTON, ASSIGNOR TO MITCHELL PRODUCTS COMPANY, OF SEATTLE, WASHINGTON, A CORPORATION OF WASHINGTON.

FLOAT-OPERATED CIRCUIT CLOSER.

Application filed February 3, 1921. Serial No. 442,202.

*To all whom it may concern:*

Be it known that I, HARRY R. MITCHELL, a citizen of the United States of America, and resident of the city of Seattle, in the county of King and State of Washington, have invented certain new and useful Improvements in Float - Operated Circuit Closers, of which the following is a specification.

This invention relates to a float operated circuit closer particularly adapted for use in conjunction with devices for indicating the level of liquid fuel in fuel tanks and having a wide field of usefulness in indicating to the drivers of motor vehicles the level of the fuel supply in the tanks of such vehicles.

It is a primary object of the present invention to provide a device of this character constituting an article of manufacture and capable of being easily and quickly screwed into position upon the gasoline tanks of motor vehicles without rendering it necessary for the owner or driver to drill holes or otherwise change the structure of the gasoline tank.

It is a further object of the invention to provide a circuit closer of the character indicated which combines with its function as a circuit closer the function of supplying atmospheric pressure to the liquid within the tank so that the tank will not become airbound.

Further objects and advantages of the invention will be set forth in the detailed description which follows.

In the accompanying drawings and diagrams I have shown my invention in the form of construction which is now preferred by me.

Figure 1 is a diagram illustrating my device connected with a fuel tank and arranged in the manner which I now prefer.

Figure 2 is a section through the tank and portions of my device, illustrating the electrical control switch.

Figure 3 is a face view of an arrangement of signaling indicia.

Figure 4 is a section through the same.

The float 1 which is placed within the fuel tank T may be of any form which is found suitable and it may be connected to the indicating or control mechanism and suspended within the tank T in any suitable manner. I have shown the float 1 as supported upon the end of an arm 10 which is pivoted in a bracket 11 extending from the top downward substantially half way to the bottom of the tank T. At the end opposite the float the arm 10 is connected to a gear 12 which meshes with a pinion 13 mounted upon the lower end of a shaft 14. The shaft 14 is supported in the bracket 11 and extends upward.

The control switch is operated through the shaft 14. In the form which I have shown herein this comprises a series of insulated segments 2 arranged about the shaft 14. A common segment 21 may be employed, and an arm 20 secured upon the upper end of the shaft 14 bridges the gap between the respective segments 2 and the common segment 21. A plurality of leads 22 are connected with the respective segments or contact points 2 and to their respective signaling indicia. The return circuit is through a power source, as the battery 23, to the common segment 21. If desired the battery 23 may be that which supplies the spark to the engine, supplied from the tank T with fuel, and a switch 24, which controls the signal circuits 22, may be the switch which controls the engine ignition circuit, which is indicated by the dotted lines 25.

The controlling switch members are preferably enclosed in a casing 26 which may be threaded upon the vent opening V of the tank T. A diaphragm 27 supports the switch members 2 and 21, and has an aperture therethrough for the projection of the shaft 14. Otherwise it is closed from above to the interior of the tank in order to prevent ignition of gas within the tank by an electric spark. Vents 28 are provided in the side walls of the casing 26 for communication between the air and the interior of the tank T. A cap 29 may be placed upon the casing 26 to protect the electric switch members.

The signaling indicia may be any which are found suitable, but for use upon an automobile, where my device would be of great service, I prefer to employ a series of electric lights 3. These may be placed upon the dashboard of the car, the leads 22 running from the tank beneath the seat or at the rear of the car to the warning lights 3 upon the dashboard. Here the lights 3 may be arranged as desired. One arrangement is shown in Figure 3. Preferably each light is covered by a glass plate 31 carrying thereon signaling indicia, such as the various fractions, corresponding to the proportion of liquid in the tank, or the amount of liquid may be represented in gallons. Such indicia are represented at 32. I prefer also to employ indicia which are distinctive from the indicia 32, and preferably I employ indicia which are distinctive also one from the other. One of these, as 33, may be a green plate 31. This one is arranged to indicate that the tank is in danger of overflowing. A second distinctive indicia plate 34 may be of red glass, or bear suitable wording to indicate that the tank is in danger of running dry and that the fuel supply is nearly exhausted. Other indicia may be employed also but it is thought that the present arrangement should be all that is necessary for use in connection with automobiles.

As the float, which is at or near the top of the tank T when the tank is full, starts to fall, due to the fuel supply being consumed, the various lights 3 are illuminated in succession. The green plate 33 may be illuminated at first, showing that no more liquid should be placed in the tank, and then in succession the numerals $\frac{3}{4}$, $\frac{1}{2}$, and $\frac{1}{4}$ will be illuminated as the fuel supply is used. Finally the red plate 34 will be illuminated, indicating that the fuel supply is nearly exhausted. The motorist is thus enabled to replenish his supply before it is exhausted, and he may know at a glance at any time the precise amount of fuel in the tank. What is more, if the switch 24 is the ignition switch of the engine he will not forget to turn off the lights 3 when the car is to be left standing, for these lights will be extinguished when the motor itself is stopped.

What I claim as my invention is:

1. A gasoline indicator for tanks comprising a casing having a diaphragm dividing its interior into an inner and an outer chamber, one end of said casing being securable to the tank at an opening therein, the walls of the inner chamber having a vent opening formed therethrough below the diaphragm and above the point of attachment to the tank, a cap tightly closing the outer chamber, an electric switch mechanism in the outer chamber, a float supported from said casing and adapted to enter the tank through the said opening therein, and means for operating the switch through the rise and fall of the float.

2. As an article of manufacture, a casing internally threaded at its lower end to screw upon the usual neck extension of a gasoline tank and spanned intermediate its height by an integral diaphragm which divides it into an upper and a lower part, a cap for closing the top of said casing, a plurality of contact elements in said casing above the diaphragm, a contact arm for engaging said contact elements, a vertical shaft by which the contact arm is carried, which passes downwardly through the diaphragm, a support depending from the diaphragm in which said shaft is journaled, a float mounted to swing about a horizontal axis, and connections between the float and the vertical shaft for imparting movement to the shaft during the rise and fall of the float, there being an opening formed in the wall of the casing below the diaphragm and above the neck extension of the tank.

Signed at Seattle, King County, Washington this 27th day of January, 1921.

HARRY R. MITCHELL.